(12) United States Patent
Arnon et al.

(10) Patent No.: US 6,321,308 B1
(45) Date of Patent: *Nov. 20, 2001

(54) METHOD AND APPARATUS FOR MANAGING ACCESS REQUESTS FROM A PLURALITY OF DEVICES USING DUAL LEVEL QUEUE LOCKING SCHEME AND A DOUBLY-LINKED CIRCULAR QUEUE

(75) Inventors: Dan Arnon, Boston; Yuval Ofek, Hopkinton, both of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,971

(22) Filed: Mar. 21, 1997

(51) Int. Cl.[7] .............................. G06F 12/00; G06F 3/00; G06F 13/00

(52) U.S. Cl. ...................... 711/147; 711/151; 711/152; 710/39; 710/54; 710/112

(58) Field of Search .................................. 711/147, 148, 711/149, 150, 151, 152; 710/39, 54, 52, 112

(56) References Cited

U.S. PATENT DOCUMENTS

| | | | |
|---|---|---|---|
| 4,807,111 | * | 2/1989 | Cohen et al. .................. 364/200 |
| 5,327,557 | * | 7/1994 | Emmond ........................ 395/650 |
| 5,339,427 | * | 8/1994 | Elko et al. ..................... 395/725 |
| 5,678,026 | * | 10/1997 | Vartti et al. .................... 395/479 |
| 5,682,537 | * | 10/1997 | Davies et al. .................. 395/726 |

OTHER PUBLICATIONS

Lang et al.—IBM Technical Disclosure Bulletin, Processor to Processor Communication with Nonmandatory Response, vol. 17, No. 2, Jul. 1974.*
IBM Technical Disclosure Bulletin, Serialization Reduction in X–Memory Communications, vol. 36, No. 09B, Sep. 1993.*
Conroy, IBM Technical Disclosure Bulletin, "Hardware/Microcode Suppor of Queuing", vol. 24, No. 6, Sep. 1981.*

* cited by examiner

*Primary Examiner*—Do Hyun Yoo
*Assistant Examiner*—Kimberly McLean
(74) *Attorney, Agent, or Firm*—John M. Gunther, Esq.; Krishnendu Gupta, Esq.; Christopher K. Gagne, Esq.

(57) ABSTRACT

A method of managing a storage system which includes a local and remote systems is provided. Link services between the two subsystems are provided though the use of a task queue. The task queue resides in a global memory of the local storage system and receives requests from the various host controllers, device, and remote controllers connected to the local storage. The remote controllers of the local storage service the requests placed in the task queue to enable data transfer between the local and remote storage systems. The task queue may be a doubly linked list of records including forward and backward pointers in addition to the request data. A two level locking scheme is employed to prevent the addition of incompatible requests to the queue and to enable maximum parallelism in servicing requests in the queue. The first level of locking applies to the entire queue and is used when records are added to and deleted from the queue. The second level of locking applies to the individual queue records. Each queue record is locked when being serviced by an associated controller. Locked records and records corresponding to device requests having another locked record are ignored by the servicing controllers.

12 Claims, 5 Drawing Sheets

METHOD AND APPARATUS FOR MANAGING ACCESS REQUESTS FROM A PLURALITY OF DEVICES USING DUAL LEVEL QUEUE LOCKING SCHEME AND A DOUBLY-LINKED CIRCULAR QUEUE

BACKGROUND OF THE INVENTION

This invention relates generally to storage systems associated with computer systems and more particularly to providing a method and apparatus for improving performance of data transactions associated with several devices connected via a bus or network.

As it is known in the art, computer systems generally include a central processing unit, a memory subsystem and a storage subsystem. According to a networked or enterprise model of a computer system, the storage subsystem associated with or in addition to a local computer system may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

One type of storage subsystem known in the art is one which includes a number of redundant disk storage devices configured as an array. Such a system is typically known as a RAID storage system. One of the advantages of a RAID type storage system is that it provides a massive amount of storage (typically in the tens to hundreds of gigabytes range) and, depending upon the RAID configuration, may provide several differing levels of fault tolerance.

In addition to the fault tolerance associated with a single storage system, additional steps may be taken to ensure that a storage system provides uninterrupted service. One method of achieving this level of system availability is to provide a so called "remote data facility". A remote data facility is, at a basic level, a second storage system. The second storage system is usually placed in a remote location and maintains a mirror image of the data stored within the local storage system. The remote data facility solution generally requires additional components be added to both the local and remote storage system to handle the data transfers therebetween.

One of the challenges of providing a remote data facility involves servicing the data transfer requests from the various host computer systems connected to the local storage system while transferring data to the remote storage system. Servicing the transfer of data from the local to the remote system may be accomplished through the use of a queue structure.

To be effective, the queue structure should always be in a valid state. That is, the queue should conform to all restrictions placed on it by the storage system. Some example of restrictions are: two host requests for the same device must not be in the queue at the same time; there may not be a copy request and a host request to the same (disk) track at the same time in the queue; a record in the queue for a remote data transfer must be locked while serviced; two records containing requests to the same device may not be locked at the same time.

The storage system places two conflicting demands on the queue. The first demand is that the queue always be in a valid state. That is, the queue must, at any given time, conform to the restrictions placed on it by the storage system. The second demand placed on the queue is one of performance. The queue must be cheap (in terms of cycle time) to access. Thus the queue must be easy to manipulate and service. In addition, the queue should allow for the highest possible degree of parallelism among the various servicing devices in order to maximize throughput between the local and remote storage system. It can be seen that the lock restrictions and the speed requirements described above are generally incompatible. It would be advantageous therefore to provide a queuing scheme which allows for a high degree of parallelism while maintaining validity of the storage system.

SUMMARY OF THE INVENTION

In accordance with the present invention, a storage management method is provided which employs a task queue accessible by all requesting and servicing controllers. The task queue may be a doubly linked list and is operable such that records may be added and deleted by the requesting controllers while requests already stored in the queue are being serviced by the servicing controllers. To maintain validity of the queue, certain constraints are placed on how records are added, deleted, and serviced. The constraints are enabled using two levels of queue locking. The first level of lock is used to lock the entire queue. This lock is only recognized by the requesting controllers when adding records and by the servicing controllers when deleting records. As such, only one controller may hold the queue lock and add or delete a record at a particular time. The queue lock is not recognized by the servicing controllers while looking for tasks to service. Thus, while records are being added to and deleted from the queue, a servicing controller may be scanning the queue looking for tasks. In addition to the queue lock, a further constraint is placed on the requesting controllers. Two similar requesting controllers (e.g. host controllers) may not each have a request to the same shared resource in the queue at the same time. Thus, requesting controllers are required to search the queue before adding their requests.

The second level lock is a record lock. The record lock is recognized by the servicing controllers and is used to prevent two requests to the same shared resource from being serviced at the same time. Thus, before performing a task from the queue, a servicing controller will first determine if the record is locked. If the record is locked, the controller moves on to the next record in the queue. In addition, the servicing controller keeps track of all locked records. That is, the shared resource associated with the locked record is recorded. When the servicing controller finds an unlocked record, it compares the resource information associated with the unlocked record to the stored information. If there is a match, indicating that the resource is associated with another locked record, the servicing controller will move on to the next record. This procedure continues until a serviceable record is found or the queue is exhausted. With such an arrangement, management services are provided which are both efficient and valid. The system is efficient due to the minimal locking of shared resources. In addition, if the additions and deletions are performed according to the constraints, it is possible to achieve simultaneous, unrestricted scans of the queue thus improving overall system performance.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
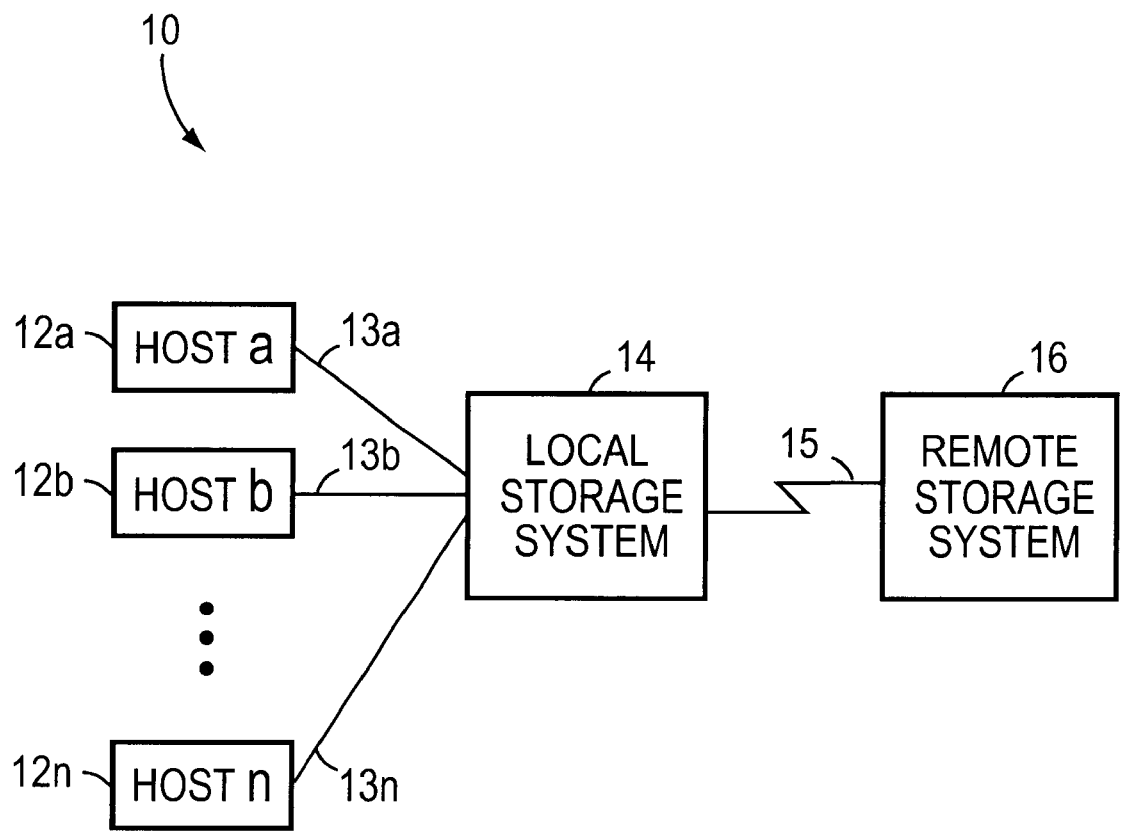
FIG. 1 is a block diagram of a storage solution which includes a storage system and a remote data facility.

Referring now to FIG. 1, network computer system 10 is shown to include, in addition to other components not shown, host computers 12a though 12n coupled to storage system 14 via buses 13a–13n respectively. Computers 12a through 12n may be any one of several well known types of computers such as servers or workstations or mainframes. Here, the generic term "host" will be used to identify any computer connected to the local storage system 14. Additionally, computer system 10 also includes a remote storage system 16 coupled to the local storage system 14 via connection 15. Connection 15 may be a fiber optic link or any other link which provides the desired bandwidth and allows for the desired physical distance between local and remote storage system 14 and 16.

Remote storage system 16 may be similar in size and configuration as storage system 14 and may be used to maintain a mirror copy of the data stored on local storage system 14. Depending on the system configuration, data may be transferred to the remote storage system as the data is received from the hosts 12a–12n. That is, when a host 12 executes a write request, the data will be written to the local storage system 14. Additionally, the local storage system will transmit the data to the remote storage system 16. In one configuration, the requesting host will receive an acknowledgment that write operation completed immediately after the write data is placed in a cache (e.g. global memory 27) within local storage system 14. In another configuration, the requesting host will not receive an acknowledgment that the write operation has completed until the data is transmitted from storage system 14 to remote storage system 16.

Figure 2:
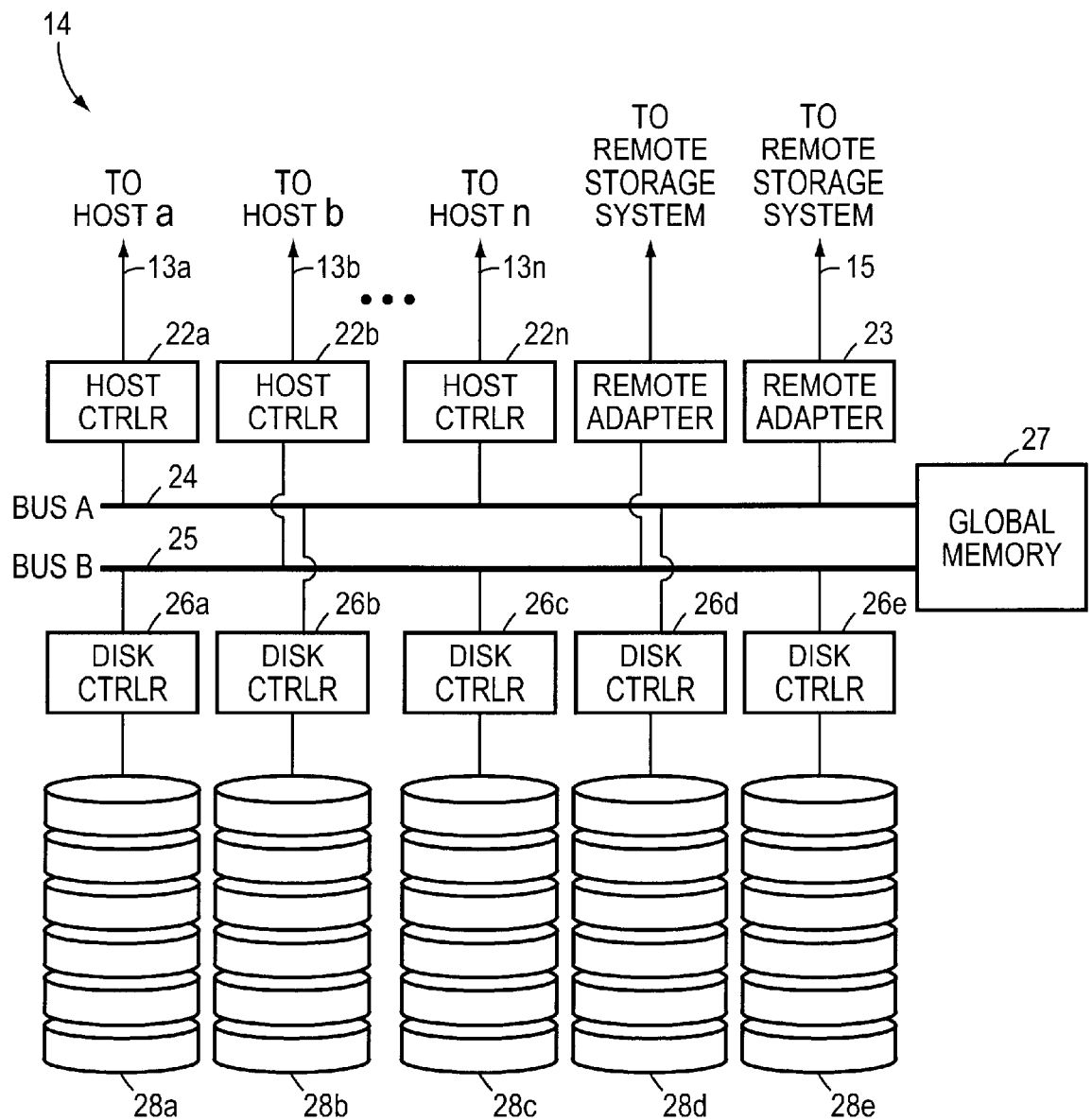
FIG. 2 is a diagrammatic representation of either one of the storage system or remote data facility of the storage solution of FIG. 1.

Referring now to FIG. 2, storage system 14 of FIG. 1 is shown in more detail to include, among other things, a plurality of bus or host controllers 22a–22n coupled to a memory or cache 27 via communication paths 24 and 25. Also coupled to the communication paths 24 and 25 are a plurality of disk controllers 26a through 26e. Each disk controller may have coupled thereto an array of disk drives 28a through 28e respectively which are used to store data for each of the hosts 12a–12n coupled to storage system 14. As stated earlier, the configuration of remote storage system 16 will preferably be the same as that shown in FIG. 2 for local storage According to the preferred embodiment of the present invention, the host controllers and disk controllers are coupled alternately to busses 24 and 25. However, each controller may be connected to both busses or other configurations may be employed. Thus the configuration of the controllers and busses of the preferred embodiment should not be seen as a limitation of the present invention.

Also according to a preferred embodiment of the present invention, global memory 27 is coupled to both buses 24 and 25 and as such is accessible by all controllers of storage system 14. Global memory 27 may be used to temporarily store data which is received from any of the hosts 12a–12n (FIG. 1) before it is written to the appropriate disk array. Likewise, global memory 27 may also be used to temporarily store data which is read from the disks of the disk arrays 28a–28n before sending it to the hosts (or to the remote storage system).

Still referring to FIG. 2, storage system 14 is shown to further include remote adapter 23. Remote adapter 23 is here coupled to bus 24 and also coupled to the remote storage system 16 via transmission link 15. Remote adapter 23 performs those transactions necessary to transmit and receive data to and from remote storage system 16. Although not shown, remote storage system 16 should also have a remote adapter which is also coupled to transmission link 15. Like remote adapter 23, the remote adapter associated with remote storage system 16 performs those transactions necessary to transmit and receive data to and from local storage system 14.

Figure 3:
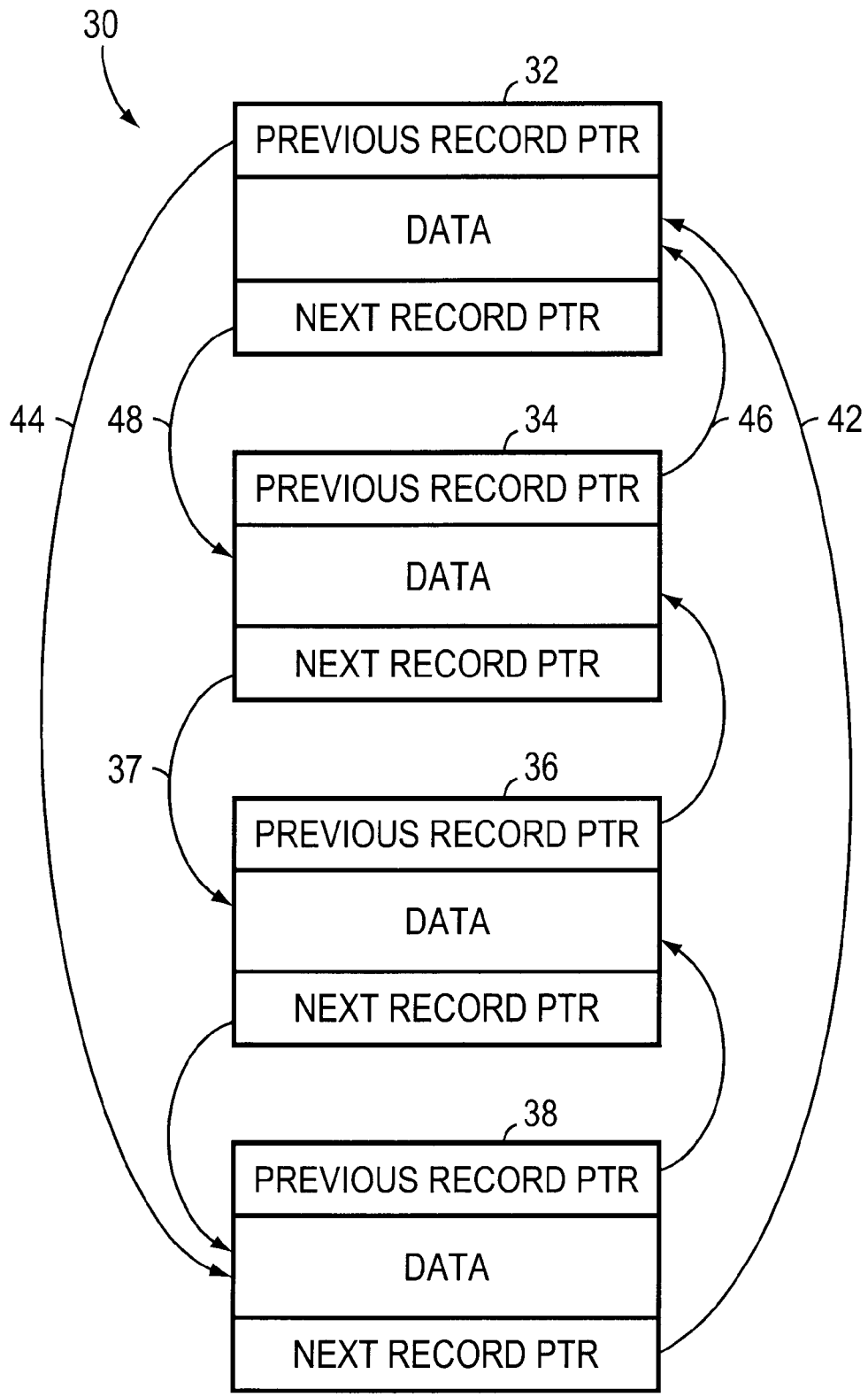
FIG. 3 is a diagrammatic representation of the queue structure used to manage data transfer requests between the storage system and remote data facility of FIG. 1.

Referring now to FIG. 3 and according to the present invention, queue structure 30 is provided in order to manage the transfers of data between local storage system 14 and remote storage system 16. Preferably the queue structure 30 is maintained in global memory 27 so that each of the controllers and adapters of storage system 14 may access the queue. However, queue 30 could be maintained in any location which is convenient and provides for access by each device which performs data transfers involving both the local and remote storage systems.

According to the present invention, when any of the controllers in storage system 14 need to perform a task which will result in data being transmitted to remote storage system 16, a request will be placed by the controller (e.g. host controller 22a) into a task queue which is typically located in global memory 27. The remote adapter 23, will service the requests placed in the queue to effect the data transfer from the local to the remote storage system. As will be described in detail below, the queue is managed in such a way as to allow additions and deletions of requests by the controllers while at the same time allowing servicing of existing requests by the remote adapter 23.

Here queue 30 is shown to include a plurality of records 32 through 38. The number of records shown here is for simplicity of illustration. In fact, the queue may have thirty or more records although the general configurations of the queue is as shown in FIG. 3. That is, queue 30 is a doubly linked list where each record maintains a pair of pointers. One pointer is a so called "previous_record" pointer and is used by one record to store the starting address of the immediately preceding record in the queue structure as illustrated by link 46. The second pointer is the so called "next_record" pointer and is used by one record to store the starting address of the immediately following record in the queue as illustrated for example by link 48. By providing the next and previous pointers described above, it is not necessary to store the queue records in a contiguous block of memory. In addition to the pointers, each record also includes a data portion. The data portion of each record may contain, among other things, information about a particular data transfer between the local and remote storage systems. The data portion also preferably includes an identifier identifying the target device (disk) and requesting device (controller) associated with the requested data transfer. Additionally, the data portion may contain status locations for storing indictors about the particular queue record's validity lock state.

In addition to being doubly linked, queue 30 is also circular. That is, as shown by link 44, the first queue record 32 maintains a (previous_record) pointer to the starting address of the last record 38 in the queue. Similarly, as illustrated by link 42, the last queue record maintains a (next_record) pointer to the starting address of the first queue record 32. As will be described in more detail below, providing a circular queue allows for the addition and deletion of records from the queue even while the queue is being scanned by the remote adapter 23 (FIG. 2).

According to the preferred embodiment of the present invention, there are three basic operations which may be performed on queue 30. These operations include: scanning the queue, adding a record, and deleting a record. There are generally two reasons for performing the scanning procedure. The first reason a scan is performed is to check for incompatibilities. As will be described in more detail below, the incompatibility scan is typically performed by one of the controllers (host or disk) of storage system 14. The controllers perform the incompatibility scan as part of the record addition operation. According to the preferred embodiment, the second type of scan is performed by the remote adapter 23. This scan is performed by the remote adapter when it is "looking for work". That is, for example, when remote adapter 23 finishes a task, it will then look to begin another task to perform. Since all requests for data transfers between the local and remote storage system are stored in the queue 30, the remote adapter will scan the queue in order to find a request to service.

Before discussing the particular features of adding, deleting and scanning records associated with queue 30, a discussion of the various queue locking mechanisms is in order. To ensure the validity of the queue and to also provide for maximum accessibility, the present invention provides two levels of locking with respect to the queue. The first lock mechanism applies to the entire queue. This lock is used during the processes of adding and deleting records from the queue. That is, if a controller needs to add a request to the queue, it first determines whether queue is locked. If the queue is not locked, the requesting controller will lock the queue and, as will be described in detail below, add a record to the queue. Once the record is added, the queue lock is released and other controllers may add their requests to the queue. A similar procedure is followed for deleting a record from the queue. However, record deletion will typically be performed by the remote adapter after it finishes the task associated with the record. The mechanism used to lock the entire queue may be any well known locking mechanism. That is, a particular bit in the queue may be set or reset depending on the lock state of the queue. Alternatively, a lock mask may be maintained for all the possible storage system queues with one bit of the storage mask indicating the lock state of queue 30. As a consequence, the means for checking the lock may be dependent on the type of lock mechanism chosen. Therefore the particular lock mechanism used does not constitute a limitation of the present invention.

The queue level lock is needed in order to prevent corruption of the queue structure which would occur due to conflicting assignments of pointers if two add/delete operations were allowed to be performed in parallel. Record addition is properly performed only if the queue does not change while it is being scanned for incompatibilities. According to the preferred embodiment, to avoid incompatibilities, there may not be two host requests for the same device at the same time in the queue. However, there may be two request for the same device in the queue as long as they are not host originated requests. For example, host controller 22a and disk controller 26b may each place a request for the same device in queue 30. On the other hand, host controller 22a and host controller 22n may not each have a request for the same device in queue 30 at the same time. In addition to the host request restriction, there may not be two copy requests to the same track (i.e. device, cylinder, head) of a disk at the same time in the queue. Lastly there may not be a copy request and a host request to the same track in the queue at the same time.

The second type of lock is a record level lock. The record level lock is used to ensure that there are not two requests to the same device (disk) being serviced at the same time (for example, by different remote adapters). As will be discussed in detail below, a remote adapter will not service a request, that is associated with a device which is identified in another record and is currently locked. As with the queue lock, record locking may be accomplished using any well known method for locking shared resources. Thus, the particular manner in which record locks are achieved and indicated to the various devices will not be discussed in detail.

Figure 5:
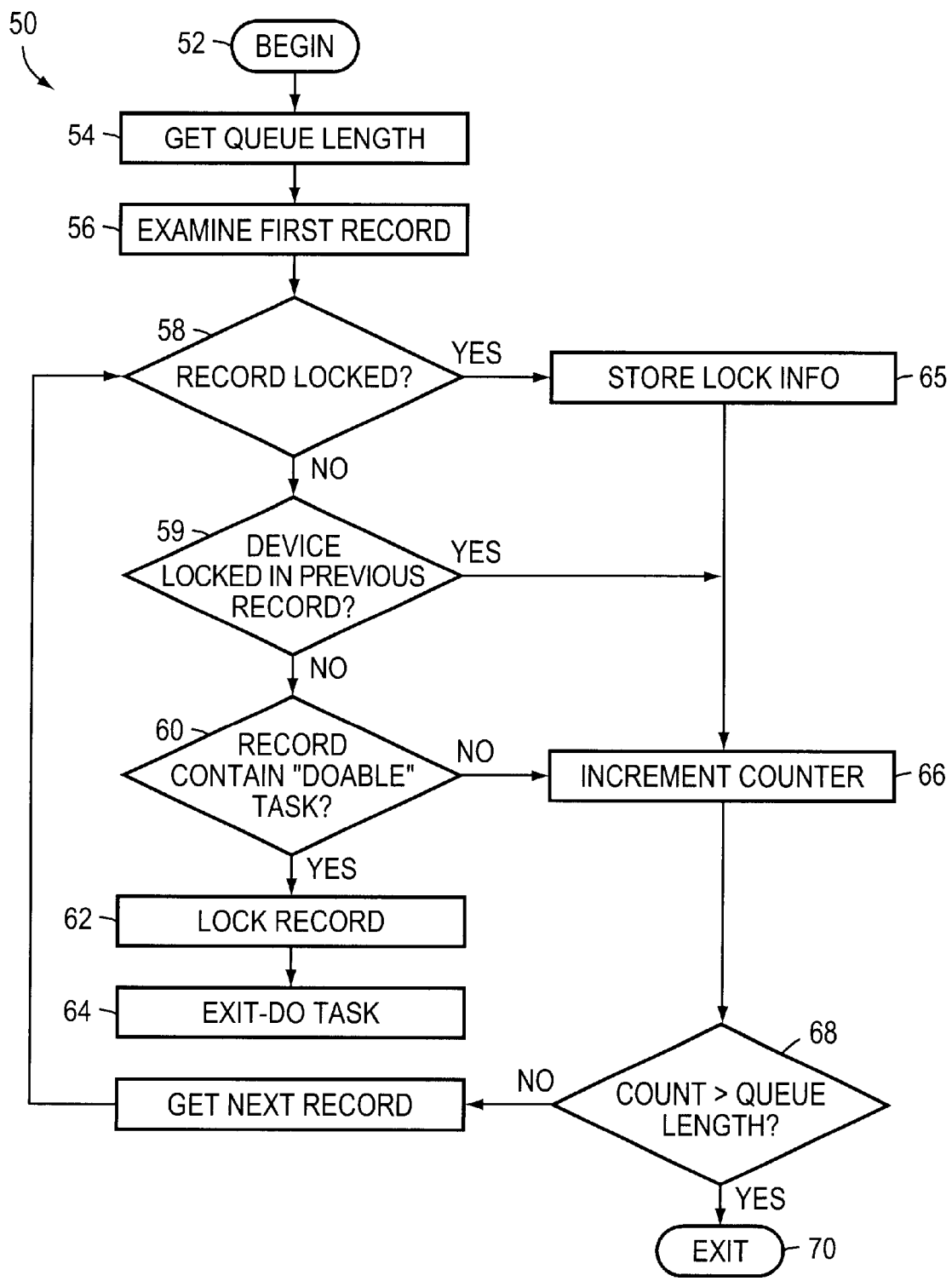
FIG. 5 is a flowchart illustrating the queue scanning procedure according to a preferred embodiment of the present invention.

The process of scanning the queue by the remote adapter 23 will now be discussed in more detail with reference to flowchart 50 of FIG. 5. The first operation performed by a remote adapter 23 before scanning queue 30 is to determine the length of the queue. This is done by reading the queue length variable as indicated in step 54 of flowchart 50. The queue length variable may be stored in global memory 27 and is updated whenever a record is added to or deleted from the queue. The queue length variable is used by the remote adapter to control the number of records scanned. As will be discussed below, records may be added to and deleted from queue 30 even while the queue is being scanned by remote adapter 23.

After determining the queue length, the remote adapter begins searching the queue records for a task to perform. When examining a record, the remote adapter will first determine if the record has been locked by another remote adapter as indicated in step 58. If the record is locked, the remote adapter makes note of the device number associated with the locked record. The remote adapter will then increment the counter and compare the incremented value to the queue length variable described above (steps 66 and 68). If the counter value is greater than the queue length variable, then this indicates that the remote adapter has completed the scan operation and then exits the scan at step 70.

If however the counter has not exceeded the queue length variable value, the remote adapter will get the next queue record using the "next_record" pointer of the record just scanned. The process then returns to step 58 where the new record is examined to determine if it is locked. If the record is not locked, the remote adapter will compare the device identification information of the record with any device numbers previously noted as being associated with a locked record. If the device identification matches the device identification associated with a record which is presently locked, then the remote adapter will skip this record, increment the counter (step 66), and continue the scanning process.

The scanning process will continue until the remote adapter finds a record which is not locked or is not associated with a device having another record in the queue which is already locked or until the queue length counter equals the queue length value. When the remote adapter does encounter an unlocked record which is not associated with a device having another locked record in the queue, the remote adapter will lock the record and begin performing the data transfer as identified in the data portion of the record. As will be described in more detail below, once the remote adapter completes the data transfer, it will delete the associated record from the queue.

Figure 4:
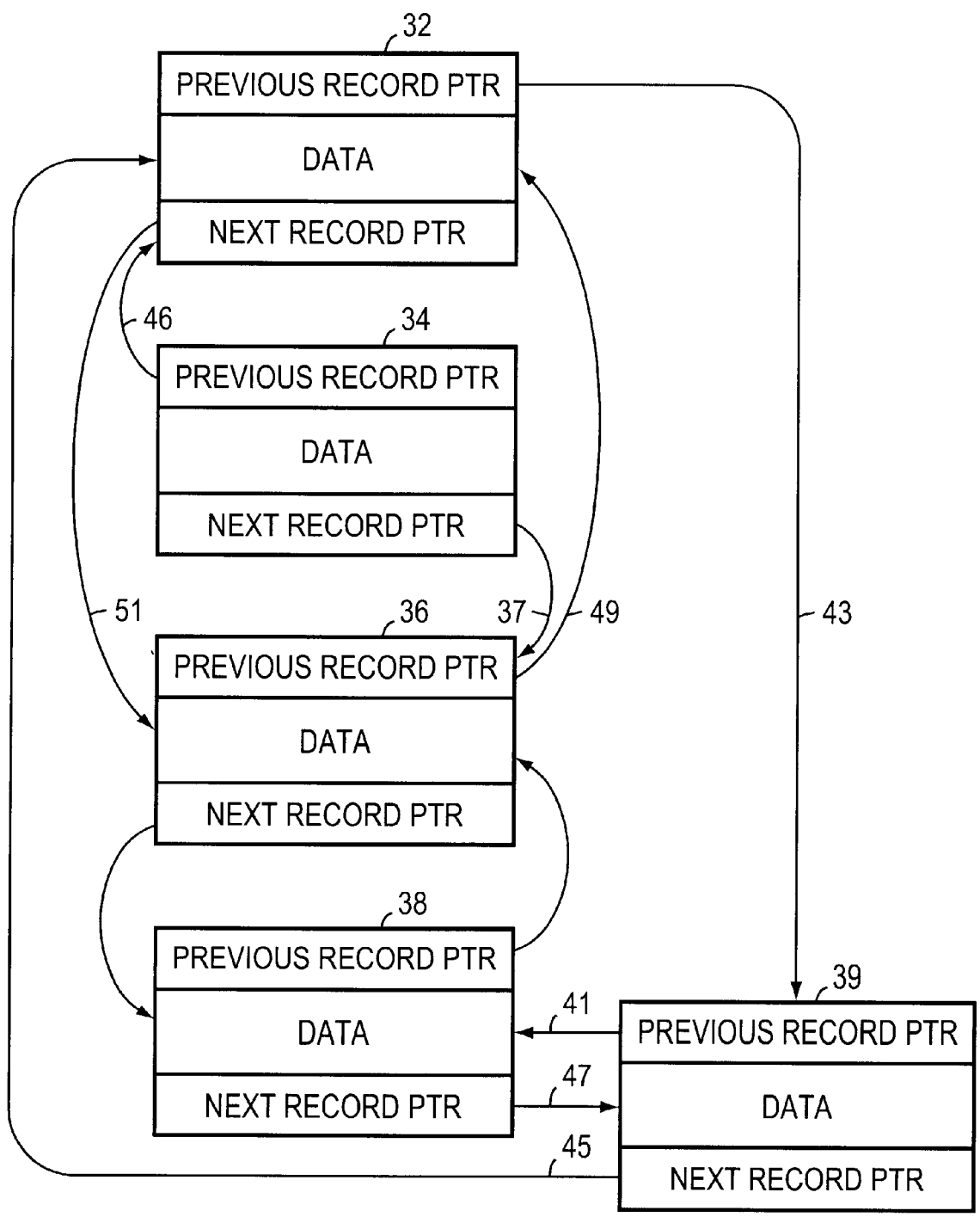
FIG. 4 is a diagrammatic representation of a record being deleted and a record being added to the queue structure of FIG. 3.

Adding records to queue 30 is performed by the host controllers 22 and/or the disk controllers 26 of the storage systems 14 (FIG. 2). Similarly, the controllers within remote storage system 16 will add and delete records to and from its associated queue. Referring now to FIGS. 3 and 4, the procedures for adding records to queue 30 will now be discussed. Recall that queue 30 is a doubly linked list. As such, any time a record is added to or deleted from the queue, several record links must be dealt with. As stated above, there may not be two host requests to the same device in the queue at the same time. As such, prior to adding a record to the queue, the host controller will scan each record in the queue to make sure that no other record represents a host request to the same device as the request sought to be added.

Additionally, before adding a record to the queue, the queue must be locked. That is, no other controller may add a record to the queue while a first controller is in the process of adding a record. So, prior to adding a record, the controller will first determine if the queue is locked. If the queue is locked, the controller will wait until the queue is unlocked and then add the record (request) to the queue. If the queue is not locked, the controller will lock the queue and begin the process of adding a record.

Once the queue has been locked, the controller will prepare a record for entry. This record, here illustrated as record 39, will be allocated from a large array of available records (not shown) which are not already included in the queue. To build a record, the controller will fill in all fields necessary to allow the record to become linked with the existing queue in addition to filling the data portion of the record with information pertinent to the request. For example, as shown in FIG. 4, the previous_record pointer field of record 39 will be written with the starting address of record 38. Similarly, the next_record pointer field will be written with the address of record 32. In addition, the data portion of the record will be filled with the data associated with the request. Only after these fields are filled, will the controller proceed with adding the record to the queue.

As is readily apparent, record 39 will not become part of queue 30 until the appropriate pointers of queue records 32 and 38 are changed. That is, to add record 39 to the queue, link 42 (FIG. 3) must be broken while link 47 is added. This link change is accomplished by changing the value of the next_record pointer in record 38 to be the address of record 39. Note, that since the next_record and previous_record pointers of record 39 have already been written, as soon as the next_record pointer in record 38 is changed to point to record 39, links 41 and 45 are immediately established. The last thing the controller must do is to change the previous_record pointer of record 32 to the address of record 39 thus establishing link 43 and completing the addition of record 39 to the queue.

The process for record deletion will be illustrated with reference to FIG. 4 and more particularly to record 34. As mentioned above, the deletion of records from queue 30 is typically performed by the remote adapter 23. To remove record 34 from queue 30, the remote adapter will first mark the record as invalid. The record may be marked invalid by setting a bit in the record to indicate that the record in no longer valid. Other methods of marking the record as being invalid may also be employed. Next, the remote adapter will change the value in the next_record pointer of record 32 to the address of record 36 thus creating link 48. Once done, the next step is to change the value of the previous_record pointer in record 36 to the address of record 32 to establish link 49.

Note that no information is changed in record 34 and as such links 37 and 46 (FIG. 3) actually remain intact although no other records point into record 34. This is important since the remote adapters may scan the queue looking for tasks to perform even while the queue is locked for addition and deletion by other controllers. That is, records may be added to and deleted from the queue even while the remote adapters are scanning the queue. Thus for example, while a remote adapter is searching the queue, it may encounter a record that is just being deleted by another remote adapter. The deleting adapter may have set the invalid bit but not yet changed the links. Without the use of a valid bit, the scanning adapter might use the record when it in fact is no longer valid. However, since the record is marked invalid as a first step, the scanning adapter will ignore the record and continue scanning. Another potential problem would be the scanning adapter getting "lost" since it is now scanning an invalid record. However, as described above, the links within the deleted record are not changed and as such when the scanning adapter uses the next_record pointer to navigate to the next record, it will find its way back into the queue even though the removal process may have completed.

Another potential problem with the deletion of records while adapters are scanning is the fact that the queue length will actually be smaller than the value read by the scanning adapter when it started its scan. Since the queue of the present invention is circular as described above, this will not actually pose a problem. That is, the remote adapter will merely continue the scan at the next_record pointer address of the last record in the queue which will actually be the first record in the queue. Although an additional scan of the first record may be performed, the process remains valid in that only valid records are considered.

As can be seen from the above description, an efficient and valid method for providing link services has been created. The method is efficient in that it makes minimal use of locking of shared resources. The method is valid in that it does not allow the creation of disallowed combinations which might otherwise lead to unpredictable results and the loss of data. It should be understood that although the above description was written in the context of servicing requests between a local and remote storage system, the ideas embodied in that description are broadly applicable. That is, one of skill in the art will readily see that the concepts described above are applicable and useful in any situation where many requesting agents desire access to a shared resource and where a copy of the shared resource is maintained.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. In a storage system having two types of controllers, requesting controllers and servicing controllers, the requesting controllers including a host controller and a disk controller, and the servicing controllers including a remote adapter, a request management system comprising:

a task queue accessible by each of said requesting and servicing controllers, said task queue including a plurality of records for storing requests from said requesting controllers;

a queue lock mechanism for preventing addition of records to and deletion of records from said task queue; and a record lock mechanism for locking individual records and indicating that a request associated with a particular record in the queue is being serviced by one of the servicing controllers;

wherein a queue lock imposed on the task queue by the queue lock mechanism is recognized by a particular requesting controller only when the particular requesting controller is to perform a task queue record addition operation, the queue lock is recognized by a particular servicing controller only when the particular servicing controller is to perform a task queue record deletion operation, the requests stored in the records in the task queue include respective requests from a first controller and a second controller, the first and second controllers are comprised in the requesting controllers, the first controller is of a first type, the second controller is of a second type, and if the first type is different from the second type, the respective requests may be for execution by a same device, but if the first type matches the second type, the respective requests are for execution by different respective devices.

2. The request management system of claim 1 wherein each respective record of said task queue includes respective forward and backward pointers for storing a respective address of a next record and a previous record respectively relative to said respective record.

3. The request management system of claim 2 wherein said forward pointer of a last record in said task queue includes an address of a first record in said task queue and wherein said backward pointer of said first record included an address of said last record in said task queue.

4. In a system having a plurality of requesting devices and a plurality of servicing devices where said servicing devices perform tasks requested by said requesting devices and wherein said tasks include accessing shared resources, the requesting devices including a host controller and a disk controller, and the servicing devices including a remote adapter, a method for managing multiple requests comprising the steps of:

providing a task queue accessible by said plurality of requesting devices and said plurality of servicing devices, said task queue including a plurality of records for storing requests from the requesting devices;

locking, by one of said plurality of requesting devices, said task queue, said locking step including preventing other ones of said plurality of requesting devices from accessing said task queue;

after said locking step, adding a record to said task queue, said record including information corresponding to a particular request to a shared resource by said one requesting device;

after said adding step, unlocking said task queue;

choosing, by one of said servicing devices, a record from said task queue;

locking by said servicing device, said chosen record;

performing a task defined by said chosen record; and after said performing step, deleting said chosen record from said task queue;

wherein the locking of the task queue by the one of the plurality of requesting devices is recognized by a particular requesting device only when the particular requesting device is to perform a task queue record addition operation, the locking of the task queue by the one of the plurality of requesting devices is recognized by a particular servicing device only when the particular servicing device is to perform a task queue record deletion operation, the requests stored in the records in the task queue include respective requests from a first controller and a second controller, the first and second controllers are comprised in the requesting devices, the first controller is of a first type, the second controller is of a second type, and if the first type is different from the second type, the respective requests may be for execution by a same device, but if the first type matches the second type, the respective requests are for execution by different respective devices.

5. The method of claim 4 wherein said choosing step further includes the steps of:

resetting a counter;

determining a length associated with said task queue, said length being equal to the number of records in said task queue;

a) examining a record in said queue;

b) determining whether said record is valid;

c) if said record is not valid, incrementing said counter, and otherwise determining whether said record is in a locked state;

if said record is in a locked state, recording device information associated with said record, incrementing said counter and proceeding to step d, otherwise determining whether said device information matches any recorded device information associated with locked records;

if said device information matches said recorded device information, incrementing said counter and proceeding to step d otherwise choosing said record as being serviceable;

d) comparing said counter to said queue length;

e) if said counter is less than said queue length, repeating steps a through d.

6. The method as in claim 4 wherein said adding and said choosing steps occur simultaneously.

7. The request management system of claim 1, wherein, if the controller of the first type and the controller of the second type are respective host controllers, the first type is considered to match the second type.

8. The request management system of claim 1, wherein, if the controller of the first type is the host controller and the controller of the second type is the disk controller, the first type is considered to be different from the second type.

9. The request management system of claim 1, wherein, if a first copy request to a track of a disk device is present in the task queue, then a second copy request to the track may not be added to the task queue while the first copy request is present in the task queue.

10. The method of claim 4, wherein, if the controller of the first type and the controller of the second type are respective host controllers, the first type is considered to match the second type.

11. The method claim 4, wherein, if the controller of the first type is the host controller and the controller of the second type is the disk controller, the first type is considered to be different from the second type.

12. The method of claim 4, wherein, if a first copy request to a track of a disk device is present in the task queue, then a second copy request to the track may not be added to the task queue while the first copy request is present in the task queue.

* * * * *